Feb. 7, 1950      F. W. AVILA      2,496,428
AXLE SUSPENSION SYSTEM FOR VEHICLES
Filed Dec. 13, 1946
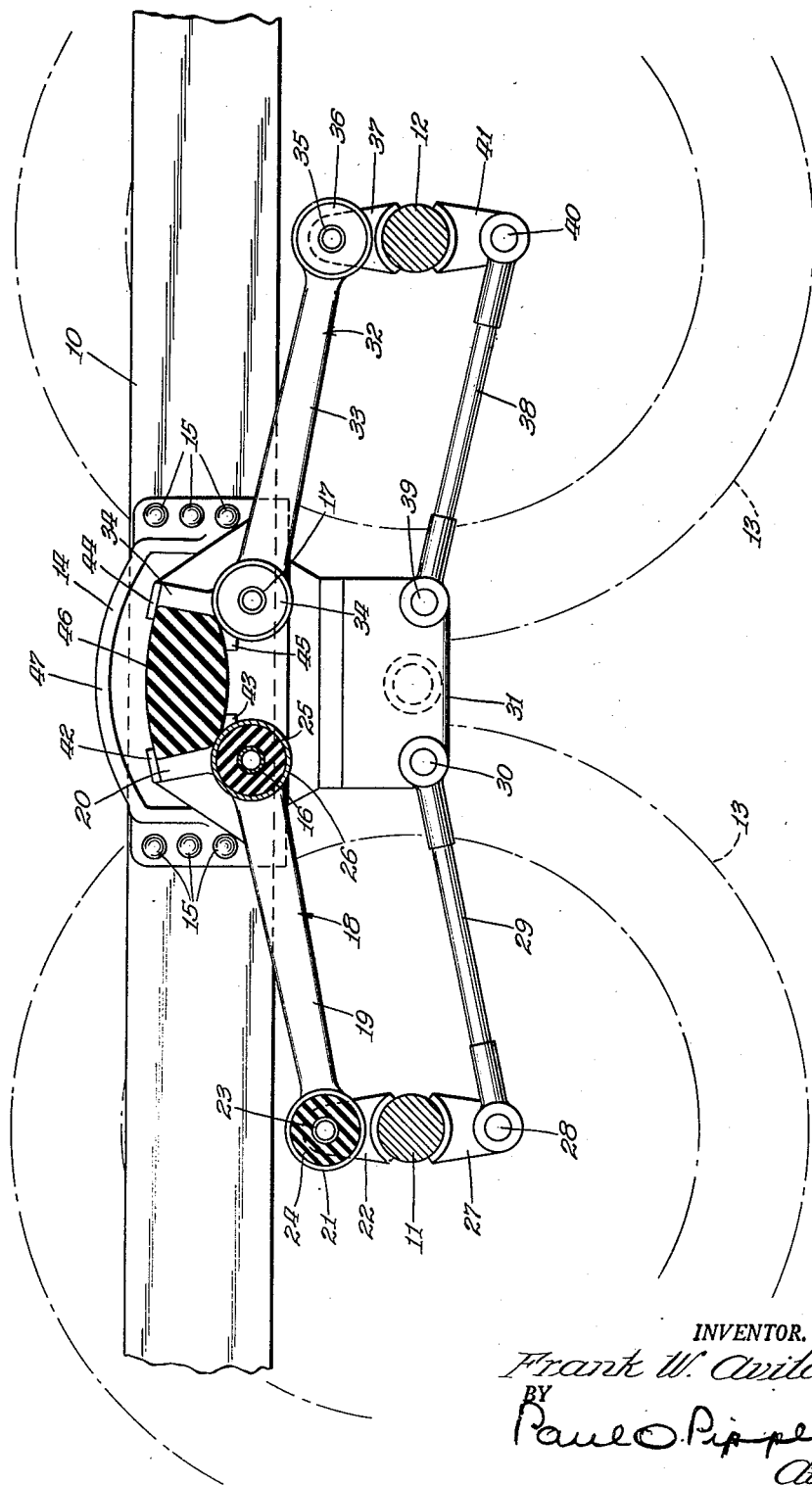
INVENTOR.
Frank W. Avila
BY
Paul O. Pippel
Atty.

Patented Feb. 7, 1950

2,496,428

UNITED STATES PATENT OFFICE 2,496,428

AXLE SUSPENSION SYSTEM FOR VEHICLES

Frank W. Avila, Columbia City, Ind., assignor to International Harvester Company, a corporation of New Jersey Application December 13, 1946, Serial No. 716,142

3 Claims. (Cl. 280—104.5)

This invention relates to a vehicle axle suspension and more particularly to an improved axle suspension system employing rubber or the like in lieu of conventional metal springs.

The invention is primarily concerned with and has for a principal object the provision of a simplified suspension system characterized by the use of rubber or the like in torsion. In another of its aspects the invention embodies the use of rubber or the like in compression; and another of the objects of the invention is to combine the action of the rubber in torsion and the rubber in compression to obtain a desirable suspension characteristic.

A still further object of the invention is to adapt the suspension system to a bogie axle construction and to arrange the suspension arms or linkage, in conjunction with the rubber components, in such a manner that relative deflection of the axles and frame results in a reaction of the suspension arms for one axle, through the rubber in compression, against the suspension arms for the other axle so that the load or deflection is shared proportionately by the two axles of the bogie.

The foregoing and other desirable objects and features of the invention will become clear when considered in the light of the following detailed description of a preferred embodiment of the invention as shown in the accompanying sheet of drawings wherein the single figure illustrates diagrammatically a suspension system as applied to the bogie construction of a motor vehicle.

In the drawings, the reference numeral 10 indicates one side rail of the vehicle main frame. This frame may be generally conventional and comprises a pair of longitudinal frame rails or sills cross-connected in the usual manner by appropriate cross members and braces, none of which details is shown. The main frame is carried on a bogie system including a pair of transversely parallel axles 11 and 12 which in turn are supported by a plurality of wheels 13, there being a pair of wheels for the axle 11 and another pair for the axle 12.

In the following description, only one side of the rear portion of the vehicle will be described but it should be understood that the structure described will appear also at the opposite side of the vehicle.

The frame rail 10 carries at a point midway between the axles 11 and 12 a supporting bracket 14 rigidly secured to the frame as by a plurality of bolts 15. This bracket rigidly carries thereon a pair of laterally outwardly extending mounting pins 16 and 17. These pins are keyed or otherwise made fast with respect to the bracket 14. The pin 16 carries thereon part of the suspension system including a longitudinally extending link in the form of a bell-crank 18 having a longer arm 19 and a shorter arm 20. The longer arm 19 extends longitudinally and slightly downwardly to a point just above the axle 11. At this point the free end of the arm 19 is provided with an enlarged hollow cylindrical end portion 21 having its axis above and parallel to the axis of the axle 11. The axle 11 carries rigidly thereon an upstanding ear 22. A hollow pin 23 is carried by the upper end of the ear 22 and is held against rotation with respect to the ear preferably by keying. A cylindrical bushing 24, formed of rubber or the like, fills the hollow cylindrical interior of the enlarged end 21 of the suspension arm 19 and has its outer surface bonded or otherwise secured to the cylindrical interior surface of the portion 21. The bushing 24 is provided with a central opening through which the pin 23 extends. The interior surface of the bushing 24 is bonded or otherwise secured to the outer cylindrical surface of the pin 23.

That portion of the bell-crank 18 at the junction of the arms 19 and 20 is mounted on the pin 16 by means of a bushing 25 formed of rubber or the like. This bushing is similar to the bushing 24 and is provided with a central opening, the interior surface of which is bonded or otherwise secured to the outer cylindrical surface of the pin 16. The outer surface of the bushing is similarly secured to the interior cylindrical surface of an enlarged portion of the bell-crank 18. The bushings 24 and 25 are preferably preloaded in torsion.

The axle 11 carries rigidly thereon a depending ear 27, the lower end of which is pivotally connected at 28 to one end of a radius rod 29. The radius rod is below and generally parallels the arm 19 of the bell-crank 18 and has its other end pivoted at 30 to a depending portion 31 rigid with or forming part of the supporting bracket 14. This radius rod functions in the usual manner to stabilize the axle 11 during relative deflection between the axle and the frame.

The axle 12 is suspended from the frame 10 by means of a bell-crank 32 which has a longer arm 33 and a shorter arm 34 corresponding to the bell-crank 18 and its arms 19 and 20. The bell-crank is mounted on the pin 17 by means of a rubber bushing 34. The mounting means is the same as that which mounts the bell-crank 18 on the pin 16. The free end of the longer arm 33 is connected by means of a pin 35 and rubber bushing 36 to an ear 37 secured to or otherwise rigidly mounted on the axle 12. The connection between the arm 33, bushing 36 and pin 35 corresponds to the connection between the arm 19, bushing 24 and pin 23 previously described. A radius rod 38 is pivotally connected at one end 39 to the depending portion 31 of the bracket 14 and at its other end at 40 to a depending ear 41 on the axle 12. The bushings 34 and 36, like the bushings 24 and 25, are preferably preloaded in torsion.

The shorter arm 20 on the bell-crank 18 is provided with upper and lower retaining lugs 42 and 43. A similar pair of lugs 44 and 45 is carried by the shorter arm 34 of the bell-crank 32. A pillow or block 46 of rubber or the like, preferably preloaded in compression, is positioned between the shorter arms 20 and 34 of the bell-cranks 18 and 32 respectively and is retained in position between these arms with the assistance of the lugs 42, 43, 44 and 45. An arcuate flange 47, preferably formed integrally with the supporting bracket 14, extends laterally outwardly and serves generally to enclose the upper intermediate portion of the suspension system; that is, the parts of the suspension system including the mounting means for the bell-cranks 18 and 32 and the rubber pillow 46, and its associated components.

Although the illustration of the invention herein is generally diagrammatic, it is thought that the structure thereof will be clear to those skilled in the art. In operation, relative deflection between the frame 10 and either of or both of the axles 11 and 12 is resiliently accommodated by means of the bushings 24, 25, 34 and 36 and the pillow or block 46. When a load is placed on the frame 10 the pivot pins 16 and 17 will move downwardly with the frame 10 and will effect rocking of the bell-cranks 18 and 32. The bell-crank 18 will be rocked in a clockwise direction and the bell-crank 32 will be rocked in a counter-clockwise direction. In either case the torsion on the bushings 25 and 34 will be increased. Likewise the torsion on the bushings 24 and 36 will be increased. Because of the reverse rocking of the bell-cranks 18 and 32, the shorter arms 20 and 34 thereof will move closer together and will increase the compression on the block or pillow 46. The radius rods 29 and 38 stabilize the axles 11 and 12.

In the event that the wheels 13 on the axle 11 encounter uneven terrain ahead of the wheels 13 on the axle 12, the bell-crank 18 will be rocked upwardly. This movement of the bell-crank 18 will react on the axle 12 through the bell-crank 32 and rubber pillow or block 46, thus transferring to the axle 12 its proportionate share of the load. A similar reaction in reverse will occur when the forward wheels 13 level out and the rearward wheel encounter the uneven spot just passed over by the wheels on the axle 11.

It will be seen from the foregoing description of a preferred embodiment of the invention that a simplified and efficient suspension system has been provided which utilizes to the utmost the qualities and combined characteristics of rubber or the like in torsion and rubber or the like in compression. It will be understood of course that the principles of the invention are capable of embodiment in a variety of structures, which embodiments will occur to those skilled in the art. It is therefore not desired that this invention be limited to the exact details of construction shown and described.

What is claimed is:

1. In a vehicle having a longitudinal frame and a pair of parallel axles transversely of and below the frame, an axle suspension system comprising: a bracket rigid on the frame and including a pair of transversely extending, closely spaced mounting pins and an arcuately shaped member extending longitudinally thereof; a pair of bell cranks, each having a longer arm and a shorter arm disposed substantially at right angles to one another, pivoted respectively on the pins with the longer arms respectively pivotally connected to the axles and with the shorter arms extending upwardly in longitudinally spaced relation; said shorter arms having projecting retaining lugs disposed at opposite ends thereof and adapted to aid in the support of resilient cushioning means when disposed therebetween; and means including rubber or the like in compression arranged between the shorter arms of the bell cranks and the retaining lugs thereon and immediately beneath said arcuate member and compressible between said shorter arms by upward swinging of the longer arms of either bell crank.

2. In a vehicle having a longitudinal frame and a pair of parallel axles transversely of and below the frame, an axle suspension system comprising: a bracket rigid on the frame and including a pair of transversely extending, closely spaced mounting pins and an arcuately shaped member extending longitudinally thereof; a pair of bell cranks, each having a longer arm and a shorter arm disposed substantially at right angles to one another with the shorter arms extending upwardly in longitudinally spaced relation; said shorter arms being provided with projecting retaining lugs disposed at opposite ends thereof and adapted to aid in the support of a resilient cushioning means positioned between said arms; bracket means including rubber in torsion pivotally connecting one end of each of the longer arms to an axle; means including rubber in torsion pivotally connecting the other end of the longer arms respectively to the mounting pins; and means including a block of rubber or the like, having at least one face thereof arcuately shaped, arranged in compression between the shorter arms and the retaining lugs of the bell cranks and disposed so that the arcuately shaped face is positioned immediately beneath said arcuate member such that said member may aid in retaining said block in position upon being compressed between said shorter arms as a result of upward swinging of the longer arms of either bell crank.

3. In a vehicle having a longitudinal frame and a pair of parallel axles transversely of and below the frame, an axle suspension system comprising: a bracket rigid on the frame and including a pair of transversely extending, closely spaced mounting pins and an arcuately shaped member extending longitudinally thereof; a pair of bell cranks, each having a longer arm and a shorter arm disposed substantially at right angles to one another, pivoted respectively on the pins with the longer arms respectively pivotally connected to the axles and with the shorter arms extending upwardly in longitudinally spaced relation; said shorter arms having projecting retaining lugs disposed at opposite ends thereof and adapted to aid in the support of resilient cushioning means when disposed therebetween; means including rubber or the like in compression arranged between the shorter arms of the bell cranks and the retaining lugs thereon and immediately beneath said arcuate member and compressible between said shorter arms by upward swinging of the longer arms of either bell crank; and means including a pair of radius rods connected respectively between the bracket and the axles.

FRANK W. AVILA.

REFERENCES CITED

The following references are of record in the file of this patent:

UNITED STATES PATENTS

| Number | Name | Date |
|---|---|---|
| 2,096,530 | Alden | Oct. 19, 1937 |
| 2,256,518 | Coote | Dec. 9, 1941 |
| 2,322,785 | Knox | June 29, 1943 |
| 2,333,107 | Knox | Nov. 2, 1943 |